United States Patent
Restall et al.

(10) Patent No.: US 10,040,467 B2
(45) Date of Patent: *Aug. 7, 2018

(54) METHOD OF REDISTRIBUTING LOOSE MATERIAL ON A SURFACE AND A SYSTEM FOR PRACTICING THE METHOD

(71) Applicant: Crary Industries, Inc., West Fargo, ND (US)

(72) Inventors: Arran Restall, Louisville, KY (US); Wayne Spier, Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 545 days.

This patent is subject to a terminal disclaimer.

(21) Appl. No.: 14/557,591

(22) Filed: Dec. 2, 2014

(65) Prior Publication Data

US 2016/0150922 A1    Jun. 2, 2016

(51) Int. Cl.
*A01G 20/43* (2018.01)
*B62B 3/00* (2006.01)
*A01G 1/12* (2006.01)

(52) U.S. Cl.
CPC ............... *B62B 3/00* (2013.01); *A01G 1/125* (2013.01); *A01G 20/43* (2018.02); *B62B 2202/50* (2013.01)

(58) Field of Classification Search
CPC ...... A01G 1/125; B62B 1/14; B62B 2202/50; A47L 9/009
See application file for complete search history.

(56) References Cited

U.S. PATENT DOCUMENTS

| | | | | |
|---|---|---|---|---|
| 3,539,150 A * | 11/1970 | Conrad | ................. | F16K 1/2028 137/856 |
| 5,107,566 A * | 4/1992 | Schmid | .................... | A47L 7/04 15/328 |
| 5,294,063 A * | 3/1994 | Bote | ...................... | A01G 3/002 15/329 |
| 5,722,110 A * | 3/1998 | McIntyre | ............... | A01G 1/125 15/327.5 |
| 6,009,595 A * | 1/2000 | Leasure | ................. | A01G 1/125 15/327.5 |
| 6,742,995 B1 * | 6/2004 | Wood | ...................... | F04B 35/06 137/269 |
| 6,883,736 B1 * | 4/2005 | Blatt | ...................... | A01C 15/04 222/626 |
| 7,004,688 B2 * | 2/2006 | Tasker | ................... | A01G 1/125 406/38 |

(Continued)

*Primary Examiner* — Kevin Murphy
(74) *Attorney, Agent, or Firm* — Wood, Phillips, Katz, Clark & Mortimer

(57) ABSTRACT

A method of setting up a system to redistribute loose material; including the steps of: obtaining a blower assembly that is configured to generate a pressurized supply of air that is discharged at an outlet; obtaining a wheeled carrying unit for the blower assembly; and operatively positioning the blower assembly on a frame on the carrying unit. The carrying unit and blower assembly are configured so that with the blower assembly operatively positioned the carrying unit can be advanced by the user over the subjacent support surface to thereby cause pressurized air generated by the blower assembly to be directed to continuously and controllably redistribute loose material residing on the subjacent support surface.

21 Claims, 11 Drawing Sheets

(56) References Cited

U.S. PATENT DOCUMENTS

| | | | |
|---|---|---|---|
| 7,506,403 B2 * | 3/2009 | Svoboda | A47L 5/14 15/347 |
| 7,841,044 B1 | 11/2010 | Weihl et al. | |
| 7,997,593 B2 * | 8/2011 | Sergyeyenko | B62B 1/12 15/340.2 |
| 8,177,914 B2 * | 5/2012 | Peters | E01H 1/0809 134/25.1 |
| 2005/0132531 A1 * | 6/2005 | Haberlein | E01H 1/0809 15/405 |
| 2007/0136983 A1 * | 6/2007 | Oberhofer | A01G 1/125 15/330 |
| 2010/0133365 A1 * | 6/2010 | Bailey | E01H 1/0809 239/663 |

* cited by examiner

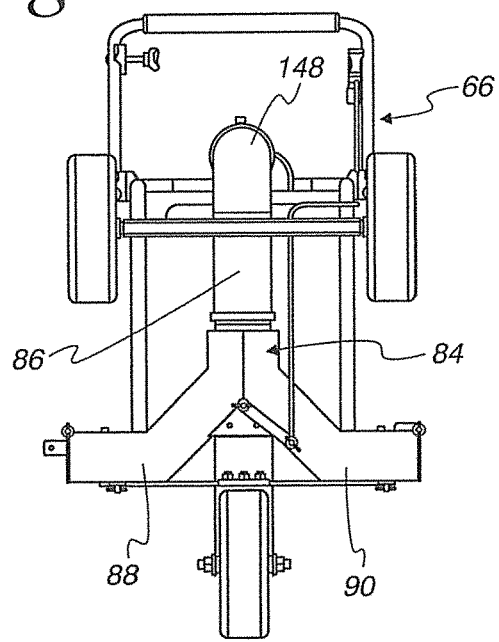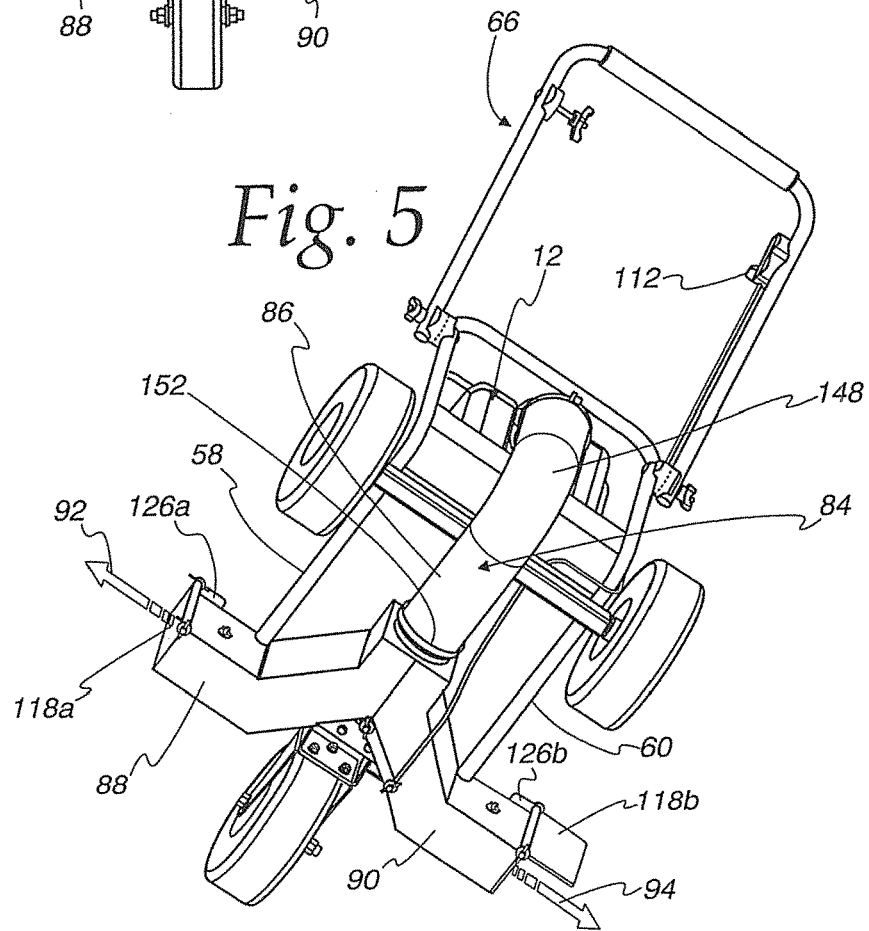

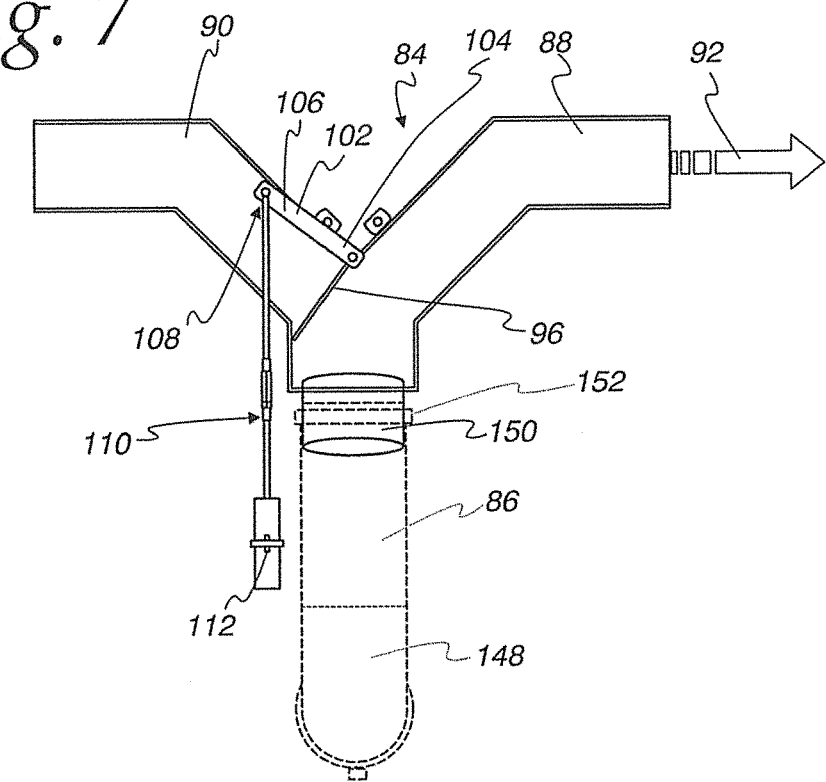
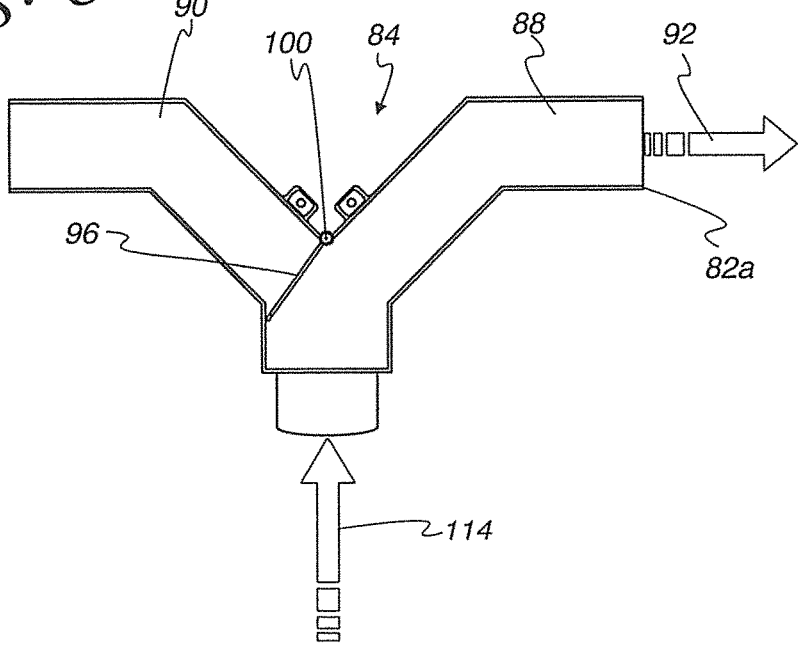

METHOD OF REDISTRIBUTING LOOSE MATERIAL ON A SURFACE AND A SYSTEM FOR PRACTICING THE METHOD

BACKGROUND OF THE INVENTION

Field of the Invention

This invention relates to landscaping equipment and, more particularly, to a method of adapting landscaping equipment to be used in different manners to redistribute loose material on a subjacent surface.

Background Art

Professional landscapers and homeowners have for decades been using portable blowers to redistribute loose material on residential and commercial properties.

One popular form of blower is a unit that is configured to be supported on a user as a backpack. Through shoulder straps, the entire operating assembly can be maintained comfortably on a user's back. A discharge tube can be projected forwardly from at the user's side to allow controlled direction of a stream of pressurized air generated by the unit. Controls are commonly integrated into the discharge tube through which a user can change operating characteristics of the unit and at the same time precisely control the direction of pressurized air discharge.

Another commonly used blower configuration, particularly in the commercial environment, is a unit that is incorporated into a wheeled frame. A handle assembly is engageable by a user and is configured and oriented to allow a user to conveniently push, pull, pivot, and turn the frame as the unit is operated. The operating components that generate the pressurized air are permanently integrated into the frame. A conduit dictates the direction of discharge of a pressurized air stream from the unit.

Both of the above types of blowers are commonly used by professional landscaping crews. Thus, purchase of quality versions of each type of unit may be appropriate and involve a substantial monetary investment.

Landscaping crews that utilize both types of equipment must also make space available to store both of the units on vehicles that transport crews from site to site. Space must likewise be allocated for storage of these units at a base location from which multiple crews may be dispatched.

By multiplying the number of units that a homeowner or business requires, repair and maintenance of such equipment correspondingly increases.

In some instances, a determination of what type of equipment is necessary for a particular job may only be made upon inspection of the site. Thus, out of an abundance of caution, crews may transport both types of equipment, potentially for each crew member, when the end result may be that one type of unit remains unused.

Further, decisions whether to utilize a backpack blower or one on a wheeled frame is often a personal choice. Some workers may not find use of the backpack configuration comfortable. Others may have anatomical problems that preclude such use. Thus, planning purchase of an appropriate mix of the two units relates to a target that moves as user preferences and personnel change.

Still further, fixed configuration units on wheeled carts are often scrapped when the operating unit fails, whereas the wheeled cart may otherwise be in working order.

In the increasingly competitive landscaping industry, efficiency has become critical, both in terms of equipment purchase and usage. Thus, the industry continues to seek out alternative designs for blowers that are affordable, reliable, and versatile. The challenge to further develop this type of equipment exists, even though the portable blower industry is mature after decades of evolution.

SUMMARY OF THE INVENTION

In one form, the invention is directed to a method of setting up a system to redistribute loose material. The method includes the step of obtaining a blower assembly. The blower assembly is configured to generate a pressurized supply of air that is discharged at an outlet. The method further includes the step of obtaining a carrying unit for the blower assembly. The carrying unit includes: a) a frame; and b) at least one wheel on the frame through which the frame can be supported upon and advanced over a subjacent support surface upon which loose material resides. The method further includes the step of operatively positioning the blower assembly on the frame. The carrying unit and blower assembly are configured so that with the blower assembly operatively positioned on the frame, the carrying unit can be advanced by the user over the subjacent support surface to thereby cause pressurized air generated by the blower assembly to be directed to continuously and controllably redistribute loose material residing on the subjacent support surface.

In one form, the step of obtaining a carrying unit involves obtaining a carrying unit wherein the frame defines a discharge conduit that causes pressurized air generated by the blower assembly to be discharged in a controlled stream in a first discharge direction.

In one form, the step of obtaining a carrying unit involves obtaining a carrying unit having an adaptor configured to communicate pressurized air from the outlet of the operatively positioned blower assembly toward the discharge conduit.

In one form, the carrying unit has a front and rear and laterally spaced sides. The step of obtaining a carrying unit involves obtaining a carrying unit wherein the frame has a handle assembly with at least one gripping region that is configured to be engaged by a user situated behind the carrying unit and upon which a force can be applied by a user to reposition the carrying unit relative to the subjacent support surface.

In one form, the step of obtaining a carrying unit involves obtaining a carrying unit wherein the handle assembly has a forwardly opening U-shaped portion upon which the gripping region is formed.

In one form, the step of obtaining a carrying unit involves obtaining a carrying unit wherein the handle assembly is configured so that the gripping region is defined on a member that is movable selectively relative to the operatively positioned blower assembly.

In one form, the carrying unit has a front and rear and laterally spaced sides. The step of obtaining a carrying unit involves obtaining a carrying unit with first and second laterally spaced wheels.

In one form, the step of obtaining a carrying unit involves obtaining a carrying unit with a third wheel situated forwardly of the first and second wheels.

In one form, the method of setting up a system to redistribute loose material further includes the step of releasably connecting the adaptor to the blower assembly.

In one form, the method further includes the step of separating the blower assembly fully from the carrying unit and operating the fully separated blower assembly to redistribute loose material on a subjacent support surface.

In one form, the method further includes the steps of simultaneously operating the blower assembly and moving the carrying unit with the operatively positioned blower assembly thereon over the subjacent support surface to continuously redistribute loose material on the subjacent support surface.

In one form, the step of obtaining a carrying unit involves obtaining a carrying unit that can be selectively reconfigured to change the discharge direction of the controlled stream from the first direction to a second direction.

In one form, the step of obtaining a carrying unit involves obtaining a carrying unit with a deflector that is configured to control at least one of: a) volume; and b) direction of the controlled discharge stream.

In one form, the deflector is moved to vary at least one of the: a) volume; and b) direction of the controlled stream.

In one form, the first and second directions are substantially opposite.

In one form, the deflector is moved by pivoting around an axis.

In one form, the carrying unit as described above has a plurality of wheels and a handle assembly with at least one gripping region that is configured to be engaged by a user situated behind the carrying unit upon which a force can be applied by a user to reposition the carrying unit relative to the subjacent support surface.

In one form, the carrying unit can be selectively reconfigured to change at least one of the: a) discharge direction of the controlled stream; and b) volume of the controlled stream. The carrying unit further includes an actuator on the handle assembly that is configured to allow the user to reconfigure the carrying unit to change the at least one of the: a) discharge direction of the controlled stream; and b) volume of the controlled stream.

In one form, the carrying unit is provided in combination with a blower assembly. The carrying unit and blower assembly are configured so that the blower assembly can be selectively: a) operatively positioned on the carrying unit to generate and direct pressurized air to the discharge conduit; and b) changed from being operatively positioned to being fully separated from the carrying unit.

In one form, the blower assembly is configured to be supported for use upon a back of a user.

In one form, the carrying unit has a main body that defines the discharge conduit. The method further includes the steps of obtaining a first deflector unit and connecting the first deflector unit to the main body to thereby change the discharge direction of the controlled stream from the first direction to the second direction.

In one form, the method further includes the steps of separating the first deflector unit from the main body, obtaining a second deflector unit, and connecting the second deflector unit to the main body in place of the first deflector unit to thereby change the discharge direction of the controlled stream from the second direction to a third direction.

BRIEF DESCRIPTION OF THE DRAWINGS

FIG. 4 is a reduced, bottom view of the system in FIG. 3 with the blower assembly operatively positioned on the carrying unit;

FIG. 5 is a bottom perspective view of the system in the FIG. 4 state;

FIG. 7 is a bottom view of a conduit assembly for directing pressurized air from the blower assembly selectively to one of two different outlets defined on the carrying unit and with a movable deflector in a first position to direct air flow to one and not the other of the outlets;

FIG. 8 is a bottom view of a portion of the conduit assembly in the FIG. 7 state;

DETAILED DESCRIPTION OF THE PREFERRED EMBODIMENT

Figure 1:
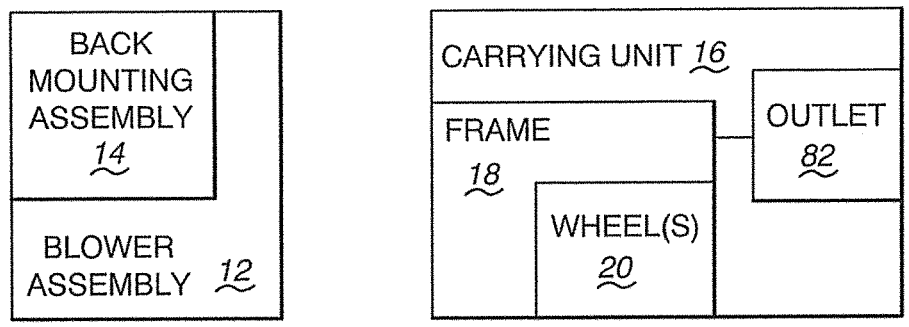
FIG. 1 is a schematic representation of a system, according to the present invention, for redistributing loose material and including a blower assembly and carrying unit.

In FIG. 1, a schematic representation of a system, according to the present invention, is shown at 10 which allows a user to selectively operate a blower assembly 12 in two different manners. The blower assembly 12 is configured so that it can be supported at the back region of a user. The precise manner of supporting the blower assembly 12 as a "backpack" is not critical to the present invention. In FIG. 1, a back mounting assembly is generically identified at 14, and may be in the form of hooks, straps, etc. An exemplary form of such back mounting assembly 14 is shown in U.S. Pat. No. 5,873,284, the disclosure of which is incorporated herein by reference.

According to the invention, a carrying unit 16 is provided consisting of a frame 18 and at least one wheel 20 on the frame through which the frame can be supported upon and advanced over a subjacent support surface upon which loose material resides.

The frame 18 is configured to allow the blower assembly 12 to be operatively positioned thereon so that the carrying unit 16 can be advanced by a user over the subjacent support surface to thereby cause pressurized air generated by the blower assembly to be directed to continuously and controllably redistribute loose material residing on the subjacent support surface.

The schematic showing in FIG. 1 is intended to encompass a wide range of different carrying unit constructions as would be obvious to one skilled in the art with the present teachings in hand. The components making up the carrying unit 16, and their interaction, may vary considerably from the design as shown in the preferred embodiments hereinbelow. The schematic showing is intended to encompass all such variations.

Figure 2:
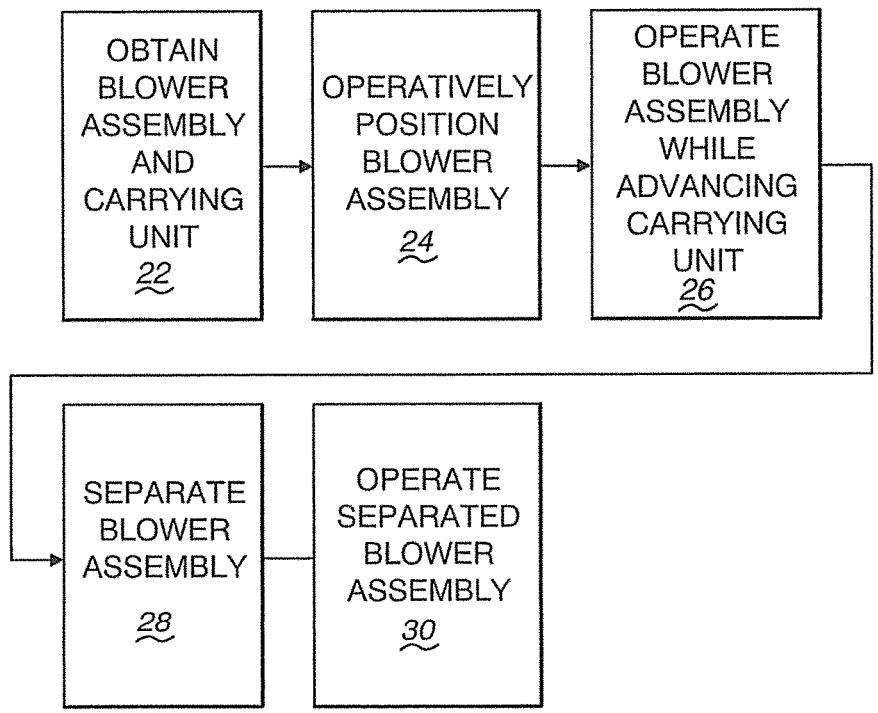
FIG. 2 is a flow diagram representation of a method of setting up a system to redistribute loose material using a system as in FIG. 1.

With the inventive system 10 in FIG. 1, a method of setting up a system to distribute loose material can be performed as shown in flow diagram form in FIG. 2.

As shown at block 22, a user obtains the blower assembly and carrying unit.

As shown at block 24, the blower assembly is operatively positioned on the carrying unit.

As shown at block 26, the user operates the blower assembly while advancing the carrying unit with the operatively positioned blower assembly.

As shown at block 28, the user separates the blower assembly from the carrying unit.

As shown at block 30, the user operates the separated blower assembly, preferably with the blower assembly supported on the user's back through a back mounting assembly as described with respect to FIG. 1.

Specific forms of the inventive system 10 are shown in FIGS. 3-12. The specific embodiments are representative of the broader concept as depicted schematically in FIG. 1, but should not be viewed as limiting.

The blower assembly 12 may be powered by a combusted fuel, electrically, etc. The precise form of the structure utilized to generate a supply of pressurized air is not critical to the present invention. The blower assembly 12 has a housing assembly 32 and a conduit 34 with an outlet 36 from which generated pressurized air is discharged during operation.

The blower assembly 12 depicted in FIGS. 3, 6, 10, and 11 is somewhat generic in nature. The precise configuration of the blower assembly 12 is not critical to the present invention. Preferably, the housing assembly 32 includes at least one housing portion 38, that is part of the blower assembly 12 or a component that is attached thereto, and that is usable to stably support the blower assembly 12, as on the carrying unit 16. As depicted, the housing portion 38 has a generally flat underside 40 that is complementary to a flat, upwardly facing surface 42 on the carrying unit frame 18.

Figure 3:
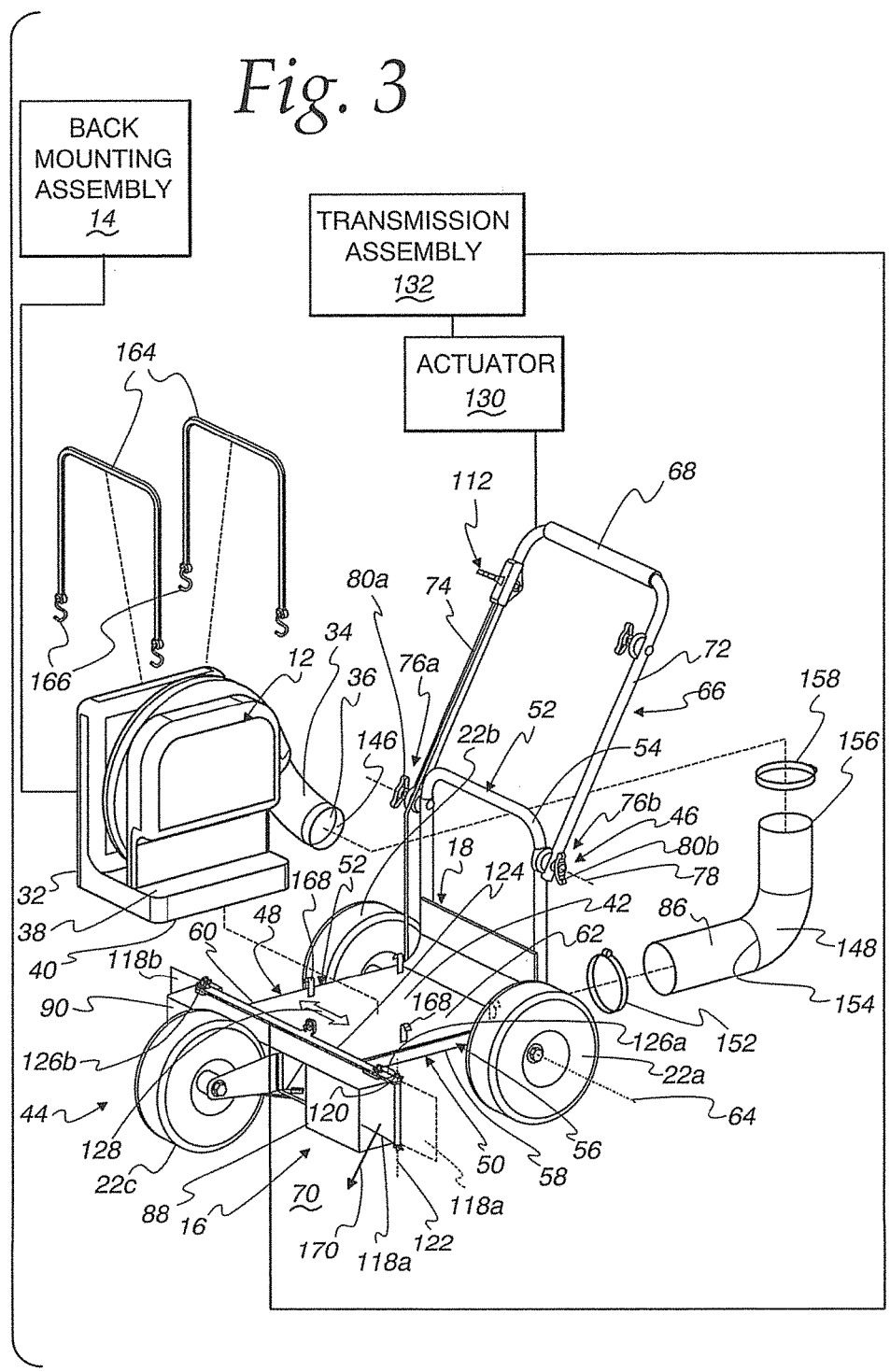
FIG. 3 is an exploded, perspective view of one specific form of system as shown schematically in FIG. 1.

As noted above, the structure for supporting the blower assembly 12 on a user's back may take a wide range of forms, generically identified as the back mounting assembly 14 in FIGS. 1 and 3.

The carrying unit 16 has a front 44, a rear 46, and laterally spaced sides 48, 50.

The frame 18, in this embodiment, has a tubular construction with a U-shaped tubular component 52 that is bent at its mid portion to define a vertical frame part 54 and a horizontal frame part at 56 defined by parallel legs 58, 60 that project generally horizontally in a forward direction from the vertical frame part 54.

A sheet/wall 62 is connected to the lower region of the vertical frame part 54 and blends into the horizontal frame part 56, spanning between, and connected to, the legs 58, 60. The sheet/wall 62 defines the surface 42 upon which the operatively positioned blower assembly 12 bears.

The frame 18 is supported upon three wheels 22a, 22b, 22c in a tricycle arrangement. Wheels 22a, 22b are located at the rear of the frame 18, are in laterally spaced relationship, and turn about a common axis 64. The wheel 22c is located at the front of the frame 18 and is laterally centered between the wheels 22a, 22b.

A handle assembly 66 is also made with a tubular construction. The handle assembly 66 has a generally U-shaped portion which opens forwardly. A member 68 at the base of the "U" defines a gripping region that is configured to be engaged by a user situated behind the carrying unit 16 upon which a force can be applied to reposition the carrying unit 16 relative to the subjacent support surface 70.

The legs 72, 74 of the U-shaped portion of the handle assembly 66 are mounted to the vertical frame part 54 through like, conventional connectors 76a, 76b which guide movement of a U-shaped handle assembly portion 66 relative to the vertical frame part 54 around a horizontally extending axis 78. Through this arrangement, with the connectors 76a, 76b loosened, the member 68 can be moved selectively relative to the operatively positioned blower assembly 12 on the carrying unit 16. By tightening knobs 80a, 80b on the connectors 76a, 76b, the handle assembly 66 can be fixed in a desired position/orientation relative to the vertical frame part 54.

The invention contemplates that at least one outlet for pressurized air be defined on the carrying unit 16. This single outlet is identified schematically at 82 in FIG. 1. In a preferred form, there are multiple outlets making possible controlled discharge of pressurized air developed by the blower assembly 12 in multiple preselected directions.

In the preferred embodiment, the carrying unit incorporates a conduit assembly 84 with a main air delivery section 86 that branches into separate air discharge sections 88, 90 from which the pressurized air can be respectively discharged in streams in opposite lateral directions, as indicated by the arrows 92, 94.

Figure 9:
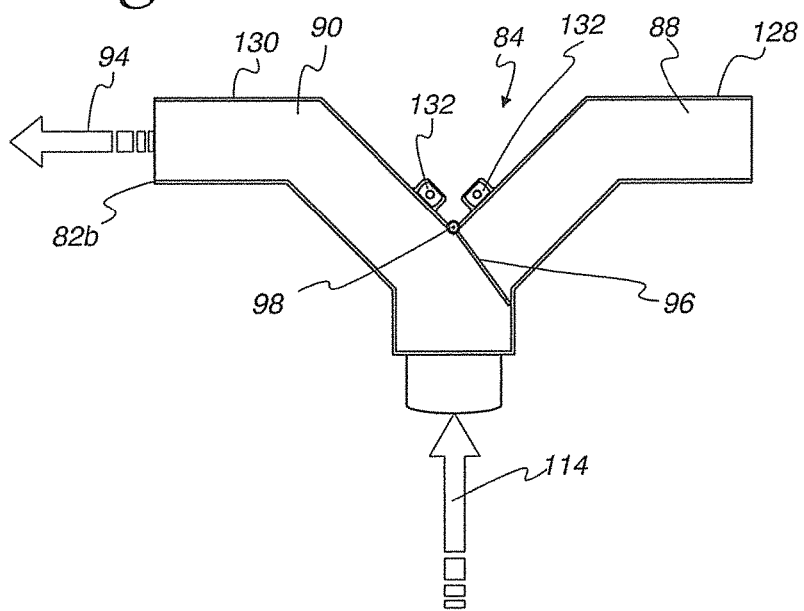
FIG. 9 is a view as in FIG. 8 wherein the deflector has been moved to cause air to be discharged at the other outlet.

As shown in FIGS. 7-9, the conduit assembly 84 has a deflector 96 that can be moved selectively between a first position, as shown in FIG. 8, and a second position, as shown in FIG. 9. The deflector 96 is mounted at a juncture between the discharge sections 88, 90 through a pin 98, which guides the deflector 96 about a vertically extending axis 100 in changing between the first and second positions.

An operating arm 102 has one end 104 connected to the deflector 96 at the location of the pin 98, to follow pivoting movement thereof, and an opposite end 106 that is pivotably connected to an end 108 of a linkage 110 that can be controlled by an operator through a remote actuator 112, preferably on the handle assembly 66. The "linkage" may be made up of a conventional cable with a central, extendible core or may be defined by a plurality of components that interact in a different manner. By operating the actuator 112, the user can pivot the operating arm 102 to change the position of the deflector 96. The precise configuration of the linkage 110 is not critical to the present invention.

The deflector 96 has a shape that is substantially matched to that of the cross-section of the discharge sections 88, 90. In this embodiment, that shape is square/rectangular.

Accordingly, with the deflector 96 in the first position, as shown in FIGS. 7 and 8, the deflector 96 directs incoming pressurized air, from the blower assembly 12 through the main delivery section 86 in the direction of the arrow 114 in FIG. 8, into the discharge section 88, while blocking flow into the discharge section 90. Accordingly, substantially the entire volume of incoming air is discharged at an outlet 82a in the direction of the arrow 92.

By changing the deflector 96 into its second position, as shown in FIG. 9, incoming flow of pressurized air through the main delivery section 86 is blocked by the deflector 96 from moving into the discharge section 88 and is directed into the discharge section 90 to and through an outlet 82b in the direction of the arrow 94.

In this embodiment, the stream of pressurized air discharges in one of two laterally opposite directions, depending upon the position of the deflector 96.

With the deflector 96 between its first and second positions, the volume of pressurized air in the stream can be changed by allowing some of the volume of the incoming air flow to bleed into one of the discharge sections 88, 90, while the primary air flow is through the other of the air discharge sections 88, 90.

Separate deflectors 118a, 118b may be provided at the outlets 82a, 82b, respectively. The deflectors 118a, 118b are shown with the same construction. Exemplary deflector 118a is mounted adjacent to the outlet 82a through a pin 120 which guides the deflector 118a in movement about a vertically extending axis 122 between a blocking position, as shown in solid lines in FIG. 3, and an open position, as shown in dotted lines in that same Figure.

The deflectors 118a, 118b may be movable independently of each other. As depicted, they are interconnected by a link 124 that is pivotably connected to rocker arms 126a, 126b, that respectively move as one piece with the deflectors 118a, 118b respectively. By laterally translating the link 124 in a path indicated by the double-headed arrow 128, the deflectors 118a, 118b are repositioned. Movement of the link 124 in one lateral direction opens one of the deflectors 118a, 118b and places the other in its blocking position. Opposite lateral movement opens the other deflector 118a, 118b and places the one deflector in its blocking position. The link movement is controlled by an actuator 130, preferably on the handle assembly 66, through an appropriate transmission assembly 132 that may utilize mechanical or electro-mechanical components. The operation of the actuator 130 may be independent of, or coordinated with, the actuator 112.

It is also contemplated that repositioning of the deflectors 118a, 118b may be carried out manually, as by directly grasping and shifting the link 124. The operator may conveniently access the link 124 from either the side or the front of the carrying unit 16 to effect manual operation thereof. In the absence of the link 124, the deflectors 118a, 118b might be independently movable, remotely or through direct engagement by an operator.

Figure 10:
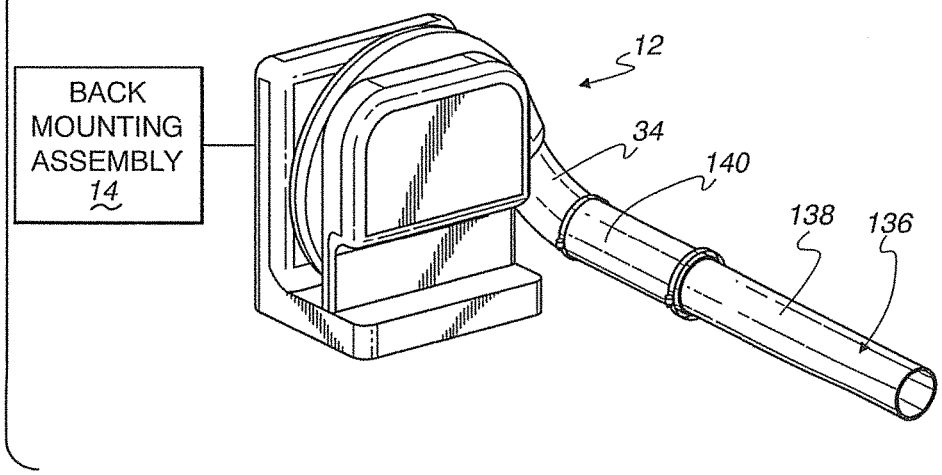
FIG. 10 is a perspective view of the blower assembly with a discharge tube attached thereto so that it is usable independently of the carrying unit.
Figure 11:
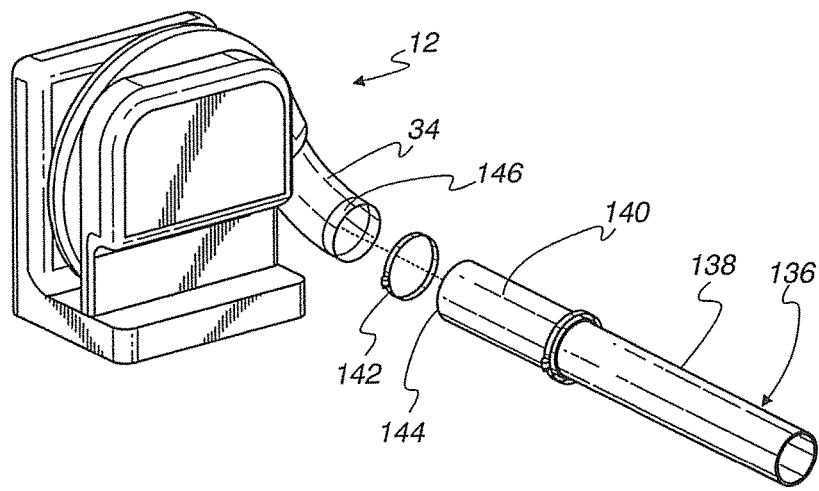
FIG. 11 is a view as in FIG. 10 with the discharge tube separated.

The blower assembly 12 is typically used, independently of the carrying unit 16, in the state as shown in FIGS. 10 and 11. That is, a discharge tube 136, as shown made from joined parts 138, 140, is releasably connected to the discharge conduit 34 using a restrictable clamp 142. As shown, the end 144 of the discharge tube 136 slides over a portion 146 of the conduit 34 and is held captively thereagainst by the clamp 142.

Figure 6:
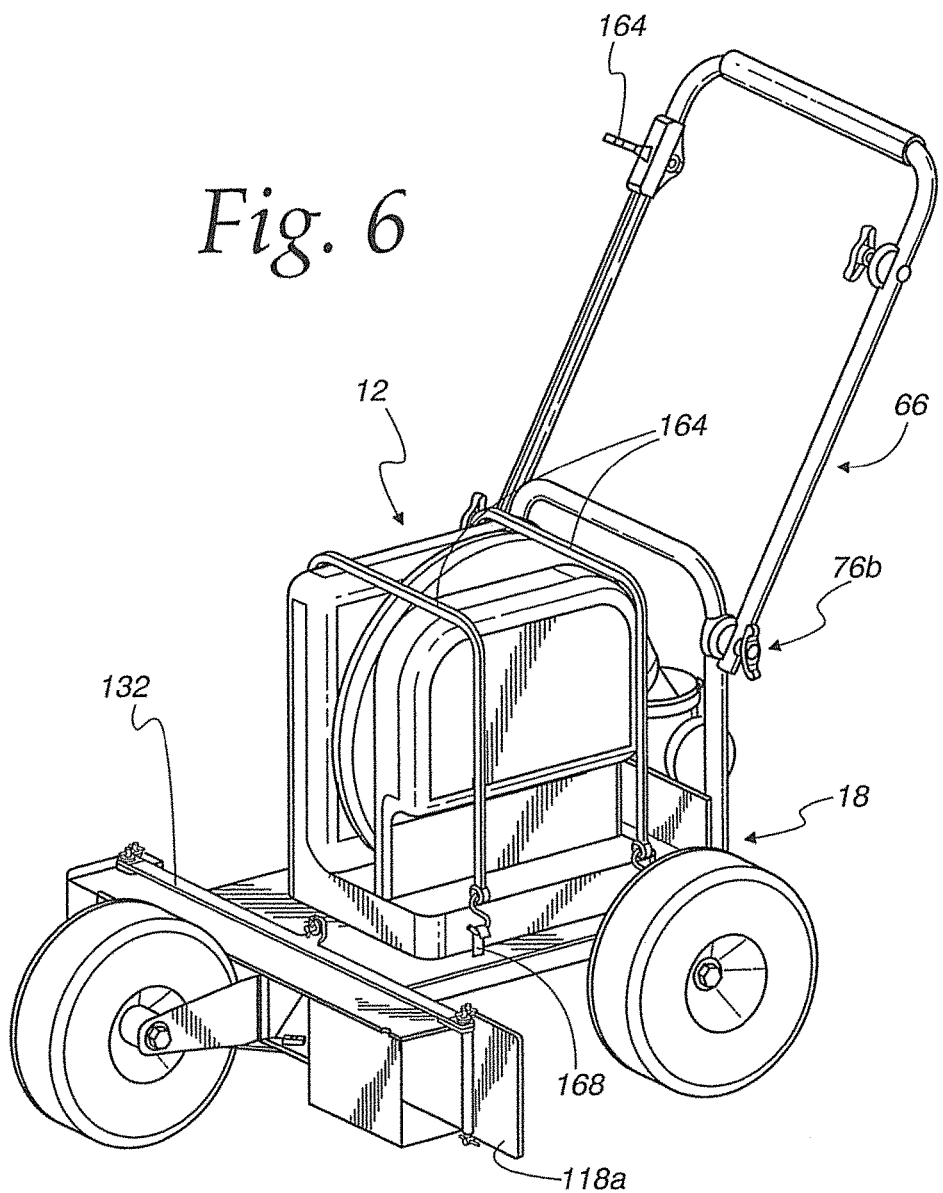
FIG. 6 is an enlarged, top, perspective view of the system in the same state as in FIGS. 4 and 5.

When it is desired to operatively position the blower assembly 12 on the carrying unit 16, the clamp 142 is released to allow separation of the discharge tube 136. The blower assembly 12 may be placed against the upwardly facing surface 42 on the frame 18, as shown in FIGS. 4-6, wherein the conduit 34 resides behind the vertical frame part 54.

An adaptor 148 is used to communicate pressurized air generated by the blower assembly 12 to the main delivery section 86 on the conduit assembly 84. The main delivery section 86 may be integrally formed with the discharge sections 88, 90 or formed as a separate piece attached thereto, as shown in FIG. 7. As a separate piece, the main delivery section 86 is held in place upon a connector 150 through restrictable clamp 152.

The adaptor 148 is shown in the form of a flexible elbow that has a natural bend of approximately 90°. This angle is not critical. The adaptor 148 has one leg 154 joined to the main delivery section 86 and a separate leg 156 joined to the portion 146 of the conduit 34 and secured by a restrictable clamp 158. Accordingly, a continuous air flow path is defined from the blower assembly outlet 36 through the adaptor 148 and main delivery section 86, from where the air flow is controllably directed to and through either of the discharge sections 88, 90.

It should be understood that while multiple interconnected components are shown between the blower assembly conduit 34 and discharge sections 88, 90, the particular number of components is not critical. It is possible that a fewer number, or a greater number, of parts may be utilized or that a single component, with a potentially fixed construction, may be pre-formed on the carrying unit 16 to be adapted to the specific blower assembly contemplated for use in conjunction with the carrying unit 16. Thus, in the description and claims herein the characterization of different components, such as the adaptor, does not mean that the adaptor must be a separate component.

The components that define the air flow path between the blower assembly and outlets 82a, 82b may be configured to stably support, and positively maintain, the blower assembly 12 upon the carrying unit 16. Alternatively, the receiving region of the carrying unit 16 may be configured so that the blower assembly 12 consistently and positively seats thereagainst. This cooperating structure is shown for the blower assembly 12 and carrying unit 16 respectively at 160, 162 in FIG. 12. The schematic showing is intended to encompass different cooperating configurations that may positively and/or consistently cause the blower assembly 12 to become operatively positioned upon the carrying unit 16. The cooperating structure may be engaged by simply translating the aligned blower assembly downwardly to against the carrying unit 16.

To further stabilize the blower assembly 12 on the carrying unit 16, one or more securing devices might be utilized. As shown in FIG. 3, a pair of elastic straps 164 may be utilized with end hooks 166 to engage anchoring hooks 168 on the frame 18. Each strap 164 can be wrapped against the laterally opposite sides and top of the blower assembly to allow the hooks 166 to be engaged with the hooks 168. The lengths of the straps 164 may be selected so that they are placed under tension to resiliently urge the blower assembly 12 against the carrying unit 16.

According to the invention, with the blower assembly in the configuration shown in FIG. 10, a user can place the blower assembly 12 on his/her back and maintain the same in the operating position through the back mounting assembly 14. The user is thus permitted to walk around with the back mounted blower assembly 12 and direct pressurized air developed thereby using the hand-controllable discharge tube 136.

Figure 12:
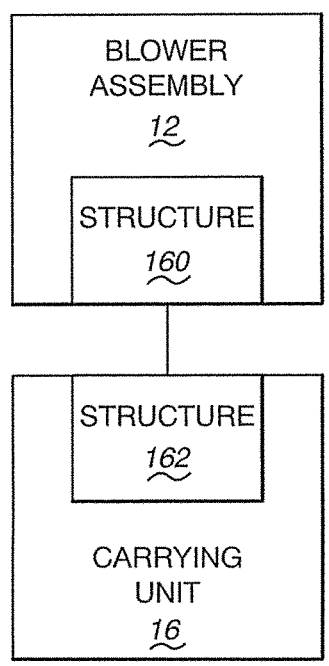
FIG. 12 is a schematic representation of structure cooperating between the blower assembly and carrying unit with the blower assembly operatively positioned.
Figure 13:
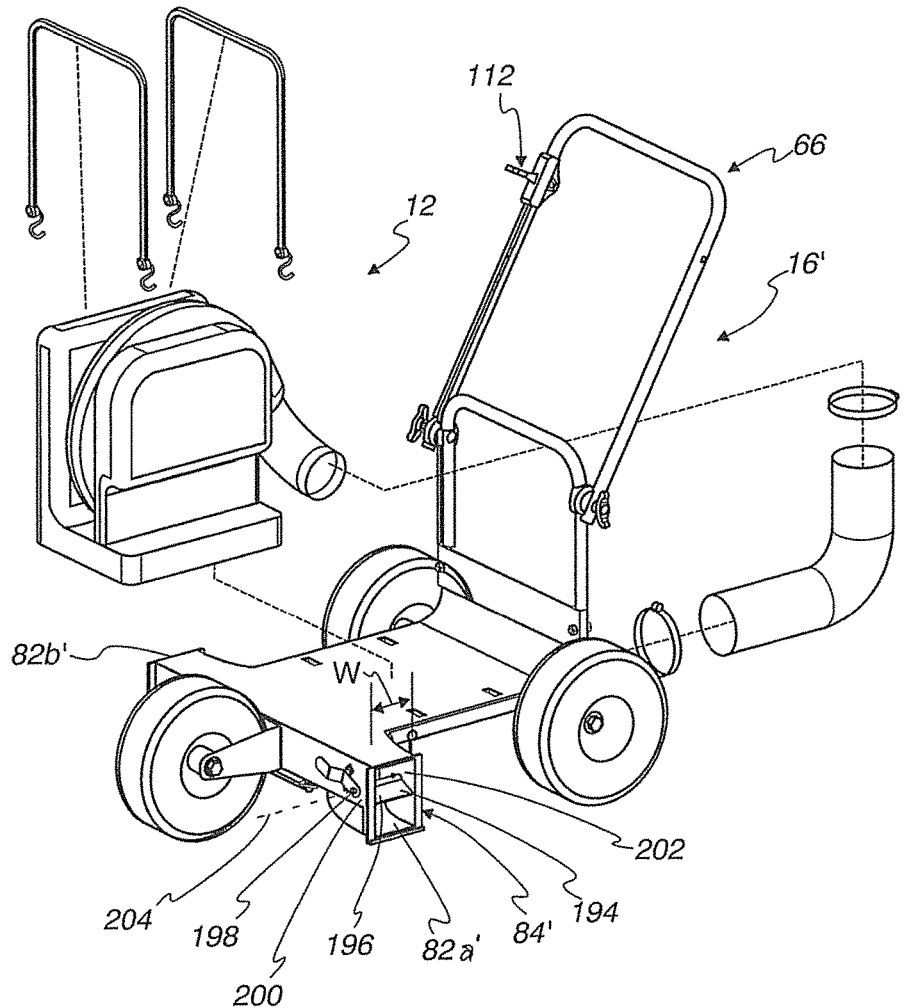
FIG. 13 is a view as in FIG. 3 and showing a modified form of carrying unit, according to the invention.
Figure 14:
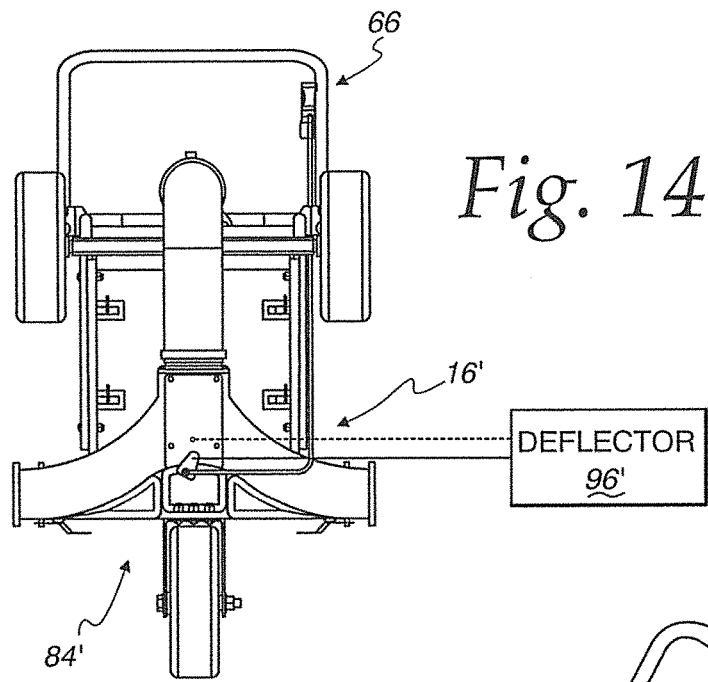
FIG. 14 is a reduced, bottom view of the system in FIG. 13 with the blower assembly operatively positioned on the carrying unit.
Figure 15:
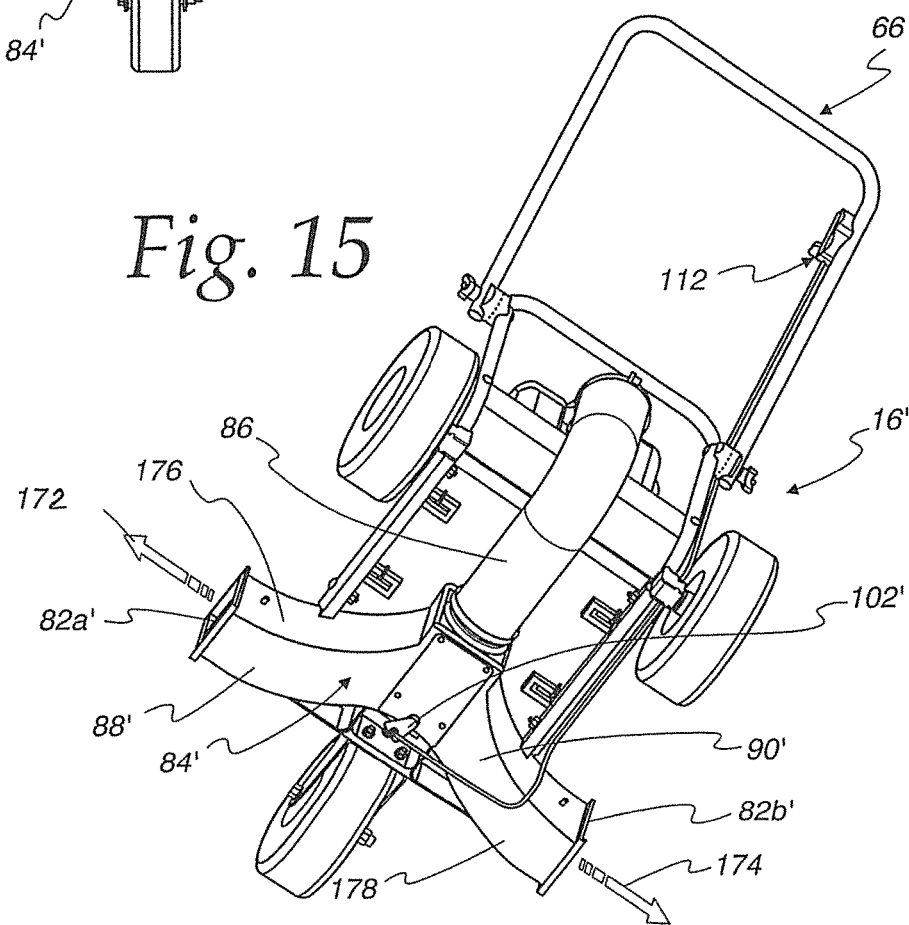
FIG. 15 is a bottom perspective view of the system in the FIG. 14 state.
Figure 16:
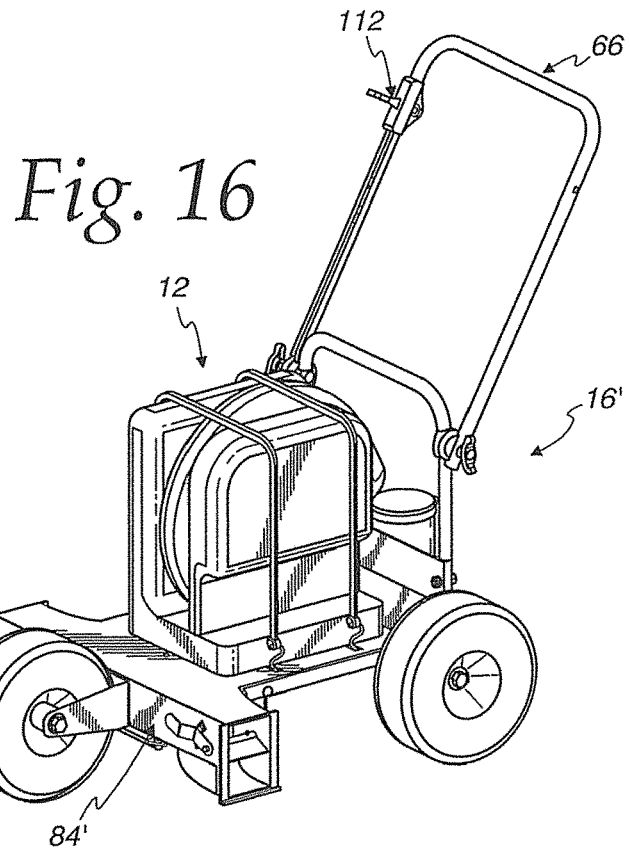
FIG. 16 is a top, perspective view of the system in the same state as in FIGS. 14 and 15.

When the user desires to operatively position the blower assembly 12 on the carrying unit 16, he/she removes the discharge tube 136 and places the blower assembly 12 onto the carrying unit 16. The connection between the conduit 34 and adaptor 148 is established. The one or more optional securing straps 164 may be utilized to more securely hold the operatively positioned blower assembly 12. Cooperating structure 160, 162, as shown in FIG. 12, may make such auxiliary securing structure unnecessary. Further, the conduit connections may by themselves be adequate to maintain the blower assembly 12 operatively positioned.

The user then operates the blower assembly 12 and maneuvers the same using the carrying unit 16. Through the actuator 112, the generated pressurized air stream can be controllably directed. In this embodiment, the user has the option of directing the pressurized air stream in laterally opposite directions, though this is not a requirement. For example, the conduit assembly 84 can be configured to allow another flow direction, such as a forward flow direction, to be established. Through the actuator 130 the user can control the position of the deflectors 118*a*, 118*b*. By selecting a position for the exemplary deflector 118*a* between the open and blocking position therefor, the deflector 118*a* intercepts and redirects the pressurized air stream to different degrees forwardly, as indicated by the arrow 170. This also changes the volume of air that is discharged in the pressurized stream over a given time period.

Should the user thereafter desire to use the blower assembly 12 in a backpack form, he/she reverses the assembly steps and reconnects the discharge tube 136.

Potentially no alteration of the blower assembly 12, other than by removing the discharge tube 136, is required to change the mode of operation.

In FIGS. 13-20, a modified form of carrying unit, according to the present invention, is shown at 16'. In the following description, parts on the carrying unit 16', corresponding to those on the carrying unit 16 but modified in any manner, will be identified with the same reference numeral with the addition of a "'" designation.

The carrying unit 16' cooperates with the blower assembly 12 in substantially the same way that the carrying unit 16 cooperates therewith. The carrying unit 16' differs from the carrying unit 16 primarily with respect to how the conduit assembly 84' is constructed.

The conduit assembly 84' cooperates with the main air delivery section 86 that branches into separate air discharge sections 88', 90' from which pressurized air can be respectively discharged in streams in opposite lateral directions, as indicated by the arrows 172, 174. The air discharge sections 88', 90' respectively have continuously curved walls 176, 178 as compared to the prior design which uses angled, flat wall portions to cooperatively produce a curved flow path.

The conduit assembly 84' utilizes a deflector 96' that is not shown in detail but operates in substantially the same fashion as the deflector 96 and is movable between corresponding first and second positions to selectively control delivery of discharging pressurized air to the outlets 82*a'*, 82*b'*. An externally exposed operating arm 102' is used to pivot the deflector 96' between its first and second positions.

In place of the deflectors 118*a*, 118*b*, the conduit assembly 84' utilizes deflectors/deflector units 180*a*, 180*b* at the outlets 82*a'*, 82*b'*. Each of the deflector units 180*a*, 180*b* has a permanently fixed elbow shape, with the deflector units 180*a* differing from the deflector units 180*b* by reason of their bend angles.

The deflector units 180*a*, 180*b* may be permanently integrated into the conduit assembly 84'. More preferably, the deflector units 180*a*, 180*b* are designed to be interchangeably attached on a main body 182 of the conduit assembly 84' whereby the operating characteristics of the carrying unit 16', with the blower assembly 12 operatively mounted thereon, can be changed.

To accomplish this, the main body 182 at the exemplary outlet 82*a'* is provided with a pair of vertically extending, elongate rails 184*a*, 184*b* that are in spaced, parallel relationship. A horizontally extending ledge 186 spans the rails 184*a*, 184*b* at the bottom thereof.

The deflector unit 180*b* has vertically extending slots 188*a*, 188*b*, each to accept one of the rails 184*a*, 184*b*.

Figure 17:
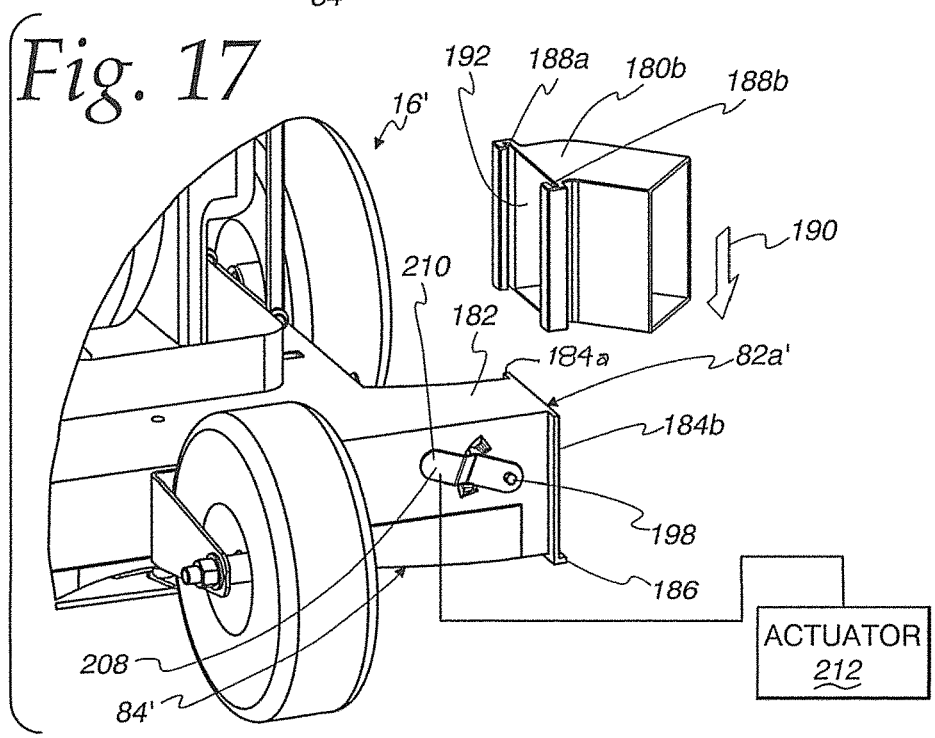
FIG. 17 is an enlarged, fragmentary, perspective view of an outlet region at one side of the unit in FIGS. 13-16 and showing a deflector unit used to control direction of discharging air and in a separated state.

With the deflector unit 180*b* fully separated from the main body 182 and in a preassembly position, as shown in FIG. 17, wherein the rails 184*a*, 184*b* and slots 188*a*, 188*b* are aligned, the deflector unit 180*b* can be advanced downwardly in the direction of the arrow 190. As this occurs, the rails 184*a*, 184*b* move guidingly in the slots 188*a*, 188*b* until the deflector unit 180*b* abuts to the ledge 186, which thereby arrests its downward movement consistently in a fully assembled position. In the fully assembled position, an inlet opening 192 on the deflector unit 180*b* is in full registration with the outlet 82*a'*.

Figure 18:
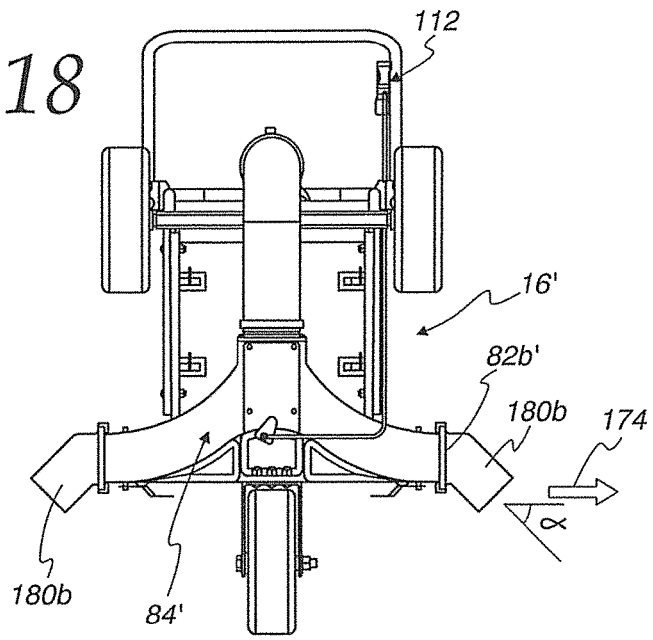
FIG. 18 is a view as in FIG. 14 with deflector units, as shown in FIG. 17, operatively positioned at each outlet.

As seen in FIG. 18, the deflector unit 180*b* causes the outflow of air at the exemplary outlet 82*b'* to deflect from a directly lateral direction, as indicated by the arrow 174, forwardly through an angle α. The angle α may vary, but in the depicted embodiment is on the order of 45°.

Figure 19:
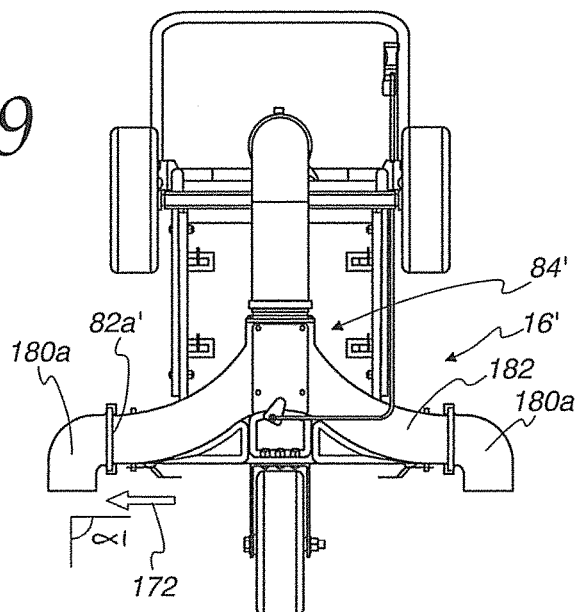
FIG. 19 is a view as in FIG. 18 with a modified form of deflector unit.

As shown in FIG. 19, the deflector unit 180*a*, as shown at the exemplary outlet 82*a'*, deflects the outflow of pressurized air from the directly lateral direction, indicated by the arrow 172, forwardly through an angle α1 that is on the order of 90°.

The deflector units 180*a*, 180*b* may be interchangeably used at either outlet 82*a'*, 82*b'*. Other deflector units (not shown) might be utilized to change the outflow direction in a different manner. For example, a deflector unit might change the flow direction in a vertical arc, as opposed to the horizontal arc effected through the deflector units 180*a*, 180*b*.

In this embodiment, the vertical arc/direction of the discharging airstream is controlled by a separate deflector 194 shown at the exemplary outlet 82*a'*. A similar deflector (not shown) is provided at the other outlet 82*b'* to operate in the same manner.

The deflector 194 spans the fore-and-aft width W of the exemplary outlet 82*a'*. The deflector 194 is in the form of a flat plate 196 with a mounting pin 198 at one edge thereof that extends through spaced wall portions 200, 202 bounding the outlet width W. The mounting pin 198 defines a horizontal pivot axis 204 for the deflector 194.

Figure 20:
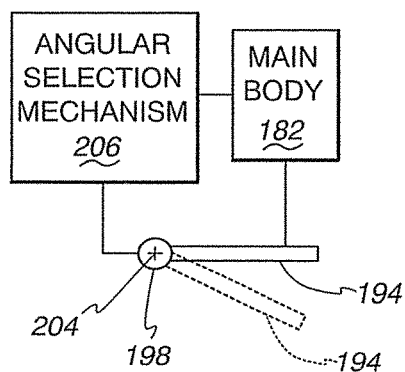
FIG. 20 is a schematic representation of a deflector used at one or both of the outlets and shown in different positions.

As shown in FIG. 20, a suitable angular selection mechanism, shown schematically at 206, may be incorporated to act between the main body 182 and the deflector 194 to maintain different angular positions for the deflector 194. The selection mechanism 206 may be of any conventional construction to allow different preselected angular positions to be maintained or to allow universal selection of angles within the full operating range for the deflector 194.

An actuator 208 is fixed to, and projects radially away from, the mounting pin 198 and is repositionable by an operator to pivot the deflector 194. In this embodiment, the actuator 208 has a graspable tab 210 which facilitates manual movement thereof. A remote actuator 212 is also contemplated, such as one incorporated into the handle assembly 66 together with, or separate from, the actuator 112.

As noted above, the invention contemplates that each of the outlets 82*a'*, 82*b'* may have an associated deflector 194.

With the above-described structure, a user has the option of using the carrying unit 16' with or without the deflector units 180*a*, 180*b*. With the deflector units 180*a*, 180*b* removed, the direction of the discharging airstream may be controlled in a vertical arc through repositioning of each deflector 194 from a neutral, horizontal position, as shown in solid lines in FIG. 20, to a downwardly angled position, as indicated by the dotted line position for the deflector 194 in FIG. 20. As noted, this downward inclination may be limited to a single position or set to be anywhere within a full range of different possible positions.

The deflectors 194 may be interconnected to be moved in a coordinated fashion. As depicted and preferred, they are movable independently of each other.

When it is desired to use the deflector units 180a, 180b, the deflector 194 is placed in the neutral, solid line position of FIG. 20 so as not to significantly obstruct discharging air flow volume. Repositioning of the deflector 194 out of the neutral position has the incidental effect of reducing the discharge volume of the pressurized air stream.

In all other respects, the carrying unit 16' is functionally the same as the carrying unit 16 and cooperate with the blower assembly 12 in substantially the same manner.

The foregoing disclosure of specific embodiments is intended to be illustrative of the broad concepts comprehended by the invention.

The invention claimed is:

1. A method of setting up a system to redistribute loose material, the method comprising the steps of:
   obtaining a blower assembly,
   the blower assembly configured to generate a pressurized supply of air that is discharged at an outlet;
   obtaining a carrying unit for the blower assembly,
   the carrying unit comprising:
   a) a frame; and
   b) at least one wheel on the frame through which the frame can be supported upon and advanced over a subjacent support surface upon which loose material resides; and
   operatively positioning the blower assembly on the frame, the carrying unit and blower assembly configured so that with the blower assembly operatively positioned on the frame the carrying unit can be advanced by the user over the subjacent support surface to thereby cause pressurized air generated by the blower assembly to be directed to continuously and controllably redistribute loose material residing on the subjacent support surface,
   wherein the carrying unit has a main body defining a discharge conduit and further comprising the steps of obtaining a first deflector unit and connecting the first deflector unit to the main body to thereby cause pressurized air generated by the blower assembly to be discharged through the discharge conduit in a first manner;
   separating the first deflector unit from the main body;
   obtaining a second deflector unit; and
   connecting the second deflector unit to the main body in place of the first deflector unit,
   the second deflector unit configured so that with the second deflector unit connected to the main body in place of the first deflector unit, pressurized air generated by the blower assembly is caused to be discharged through the discharge conduit in a second manner different than the first manner.

2. The method of setting up a system to distribute loose material according to claim 1 wherein the pressurized air generated by the blower assembly is discharged through the discharge conduit in a controlled stream.

3. The method of setting up a system to distribute loose material according to claim 2 wherein the step of obtaining a carrying unit comprises obtaining a carrying unit comprising an adaptor configured to communicate pressurized air from the outlet of the operatively positioned blower assembly toward the discharge conduit.

4. The method of setting up a system to distribute loose material according to claim 3 further comprising the step of releasably connecting the adaptor to the blower assembly.

5. The method of setting up a system to distribute loose material according to claim 2 wherein the step of obtaining a carrying unit comprises obtaining a carrying unit that can be selectively reconfigured to change a discharge direction of the controlled stream.

6. The method of setting up a system to distribute loose material according to claim 5 wherein the controlled stream can be directed in first and second directions that are substantially opposite.

7. The method of setting up a system to distribute loose material according to claim 2 where the step of obtaining a carrying unit comprises obtaining a carrying unit with a deflector that is configured to control at least one of: a) volume; and b) direction of the controlled stream.

8. The method of setting up a system to distribute loose material according to claim 7 further comprising the step of moving the deflector to vary at least one of the: a) volume; and b) direction of the controlled stream.

9. The method of setting up a system to distribute loose material according to claim 8 wherein the deflector is moved by pivoting around an axis.

10. The method of setting up a system to distribute loose material according to claim 1 wherein the carrying unit has a front and rear and laterally spaced sides and the step of obtaining a carrying unit comprises obtaining a carrying unit wherein the frame comprises a handle assembly with at least one gripping region that is configured to be engaged by a user situated behind the carrying unit upon which a force can be applied by a user to reposition the carrying unit relative to the subjacent support surface.

11. The method of setting up a system to distribute loose material according to claim 10 wherein the step of obtaining a carrying unit comprises obtaining a carrying unit wherein the handle assembly has a forwardly opening U-shaped portion upon which the gripping region is formed.

12. The method of setting up a system to distribute loose material according to claim 10 wherein the step of obtaining a carrying unit comprises obtaining a carrying unit wherein the handle assembly is configured so that the gripping region is defined on a member that is movable selectively relative to the operatively positioned blower assembly.

13. The method of setting up a system to distribute loose material according to claim 1 wherein the carrying unit has a front and rear and laterally spaced sides and the step of obtaining a carrying unit comprises obtaining a carrying unit wherein the at least one wheel comprises first and second laterally spaced wheels.

14. The method of setting up a system to distribute loose material according to claim 13 wherein the step of obtaining a carrying unit comprises obtaining a carrying unit wherein the at least one wheel comprises a third wheel situated forwardly of the first and second wheels.

15. The method of setting up a system to distribute loose material according to claim 1 further comprising the step of separating the blower assembly fully from the carrying unit and operating the fully separated blower assembly to redistribute loose material on the subjacent support surface.

16. The method of setting up a system to distribute loose material according to claim 1 further comprising the steps of simultaneously operating the blower assembly and moving the carrying unit with the operatively positioned blower assembly over the subjacent support surface to continuously redistribute loose material on the subjacent support surface.

17. A carrying unit for a blower assembly usable to set up a system to redistribute loose material,
the carrying unit comprising:
a) a frame configured to support a blower assembly in an operative position;
b) a plurality of wheels on the frame through which the frame can be supported upon and advanced over a subjacent support surface upon which loose material resides;
c) a handle assembly with at least one gripping region that is configured to be engaged by a user situated behind the carrying unit upon which a force can be applied by a user to reposition the carrying unit relative to the subjacent support surface,
the carrying unit configured so that with a blower assembly operatively positioned on the frame the carrying unit can be advanced by the user over the subjacent support surface to thereby cause pressurized air generated by the blower assembly to be directed to continuously and controllably redistribute loose material residing on the subjacent support surface,
wherein the carrying unit has a main body defining a discharge conduit; and
d) first and second deflector units each with a permanently fixed shape and connectable selectively to the main body, one in place of the other,
the permanently fixed shapes of the first and second deflector units different to thereby cause and allow pressurized air generated by an operatively positioned blower assembly to be discharged through the discharge conduit in only a first manner with the first deflector unit connected to the main body and only in a second manner, different than the first manner with the second deflector unit connected to the main body.

18. A carrying unit for a blower assembly usable to set up a system to redistribute loose material,
the carrying unit comprising:
a) a frame configured to support a blower assembly in an operative position;
b) a plurality of wheels on the frame through which the frame can be supported upon and advanced over a subjacent support surface upon which loose material resides;
c) a handle assembly with at least one gripping region that is configured to be engaged by a user situated behind the carrying unit upon which a force can be applied by a user to reposition the carrying unit relative to the subjacent support surface,
the carrying unit configured so that with a blower assembly operatively positioned on the frame the carrying unit can be advanced by the user over the subjacent support surface to thereby cause pressurized air generated by the blower assembly to be directed to continuously and controllably redistribute loose material residing on the subjacent support surface,
wherein the carrying unit has a main body defining a discharge conduit; and
d) first and second deflector units connectable selectively to the main body, one in place of the other, and configured to cause pressurized air generated by an operatively positioned blower assembly to be discharged through the discharge conduit in first and second different manners,
wherein the discharge conduit is configured to cause discharge of a controlled stream of pressurized air from an operatively positioned blower assembly and the carrying unit can be selectively reconfigured to change at least one of the: a) discharge direction of the controlled stream; and b) volume of the controlled stream,
wherein the carrying unit further comprises an actuator on the handle assembly that is configured to allow the user to reconfigure the carrying unit to change the at least one of the: a) discharge direction of the controlled stream; and b) volume of the controlled stream.

19. The carrying unit as recited in claim 18 in combination with a blower assembly, the carrying unit and blower assembly configured so that the blower assembly can be selectively: a) operatively positioned on the carrying unit to generate and direct pressurized air to the discharge conduit; and b) changed from being operatively positioned to being fully separated from the carrying unit.

20. The carrying unit in combination with a blower assembly as recited in claim 19 wherein the blower assembly is configured to be supported for use upon a back of a user.

21. A method of setting up a system to distribute loose material, the method comprising the steps of:
obtaining a blower assembly,
the blower assembly configured to generate a pressurized supply of air that is discharged at an outlet;
obtaining a carrying unit for the blower assembly,
the carrying unit comprising:
a) a frame; and
b) at least one wheel on the frame through which the frame can be supported upon and advanced over a subjacent support surface upon which loose material resides;
operatively positioning the blower assembly on the frame,
the carrying unit and blower assembly configured so that with the blower assembly operatively positioned on the frame the carrying unit can be advanced by the user over the subjacent support surface to thereby cause pressurized air generated by the blower assembly to be directed to continuously and controllably redistribute loose material residing on the subjacent support surface,
wherein the step of obtaining a carrying unit comprises obtaining a carrying unit wherein the frame defines a discharge conduit that causes pressurized air generated by the blower assembly to be discharged in a controlled stream in a first discharge direction,
wherein the step of obtaining a carrying unit comprises obtaining a carrying unit that can be selectively reconfigured to change the discharge direction of the controlled stream from the first direction to a second direction,
wherein the carrying unit has a main body defining the discharge conduit and further comprising the steps of obtaining a first deflector unit and connecting the first deflector unit to the main body to thereby change the discharge direction of the controlled stream from the first direction to the second direction;
separating the first deflector unit from the main body;
obtaining a second deflector unit; and
connecting the second deflector unit to the main body in place of the first deflector unit to thereby change the discharge direction of the controlled stream from the second direction to a third direction.

* * * * *